United States Patent
Horn et al.

(10) Patent No.: US 11,202,192 B2
(45) Date of Patent: Dec. 14, 2021

(54) REGISTERING USER EQUIPMENT WITH A VISITED PUBLIC LAND MOBILE NETWORK

(71) Applicant: Nokia Technologies Oy, Espoo (FI)

(72) Inventors: Guenther Horn, Munich (DE); Anja Jerichow, Grafing (DE)

(73) Assignee: Nokia Technologies Oy, Espoo (FI)

(*) Notice: Subject to any disclaimer, the term of this patent is extended or adjusted under 35 U.S.C. 154(b) by 22 days.

(21) Appl. No.: 16/639,335

(22) PCT Filed: Aug. 21, 2017

(86) PCT No.: PCT/FI2017/050583
§ 371 (c)(1),
(2) Date: Feb. 14, 2020

(87) PCT Pub. No.: WO2019/038464
PCT Pub. Date: Feb. 28, 2019

(65) Prior Publication Data
US 2021/0037372 A1 Feb. 4, 2021

(51) Int. Cl.
*H04W 8/06* (2009.01)
*H04L 9/06* (2006.01)
(Continued)

(52) U.S. Cl.
CPC ............. *H04W 8/06* (2013.01); *H04L 9/0643* (2013.01); *H04L 9/0844* (2013.01);
(Continued)

(58) Field of Classification Search
CPC ....... H04W 8/06; H04W 12/02; H04W 12/08; H04W 60/04; H04W 8/26; H04W 8/18;
(Continued)

(56) References Cited

U.S. PATENT DOCUMENTS

| 6,373,949 B1* | 4/2002 | Aura ..................... H04W 12/02 380/247 |
| 2009/0267730 A1* | 10/2009 | Zhang .................. H04L 9/3273 340/5.8 |
| 2017/0359344 A1* | 12/2017 | Kaal ................... H04W 12/062 |

FOREIGN PATENT DOCUMENTS

| WO | 03/055249 A1 | 7/2003 |
| WO | 2017/072349 A1 | 5/2017 |

OTHER PUBLICATIONS

Extended European Search Report received for corresponding European Patent Application No. 17922444.9, dated Feb. 18, 2021, 6 pages.

(Continued)

*Primary Examiner* — Mazda Sabouri
(74) *Attorney, Agent, or Firm* — Harrington & Smith

(57) ABSTRACT

User equipment is registered with a visited public land mobile network, VPLMN, in a process including: producing at the user equipment a concealed identifier; producing at the user equipment a freshness code; and sending by the user equipment to the VPLMN the concealed identifier and the freshness code; receiving by the user equipment an identity request from the VPLMN indicating that the long-term identifier must be transmitted to the VPLMN in a non-concealed form; receiving by the user equipment from the VPLMN a permission authenticator; and verifying at the user equipment if the permission authenticator has been formed with a cryptographic authentication of the home public land mobile network, HPLMN, and the user equipment or a subscription module at the user equipment indicating permission to transmit the long-term identifier to the VPLMN in the non-concealed form and if yes, transmitting the long-term identifier to the VPLMN in the non-concealed form.

15 Claims, 2 Drawing Sheets

(51) Int. Cl.
*H04L 9/08* (2006.01)
*H04L 9/32* (2006.01)
*H04L 29/06* (2006.01)
*H04W 12/02* (2009.01)
*H04W 12/08* (2021.01)
*H04W 60/04* (2009.01)

(52) U.S. Cl.
CPC ............ *H04L 9/3271* (2013.01); *H04L 63/30* (2013.01); *H04W 12/02* (2013.01); *H04W 12/08* (2013.01); *H04W 60/04* (2013.01)

(58) Field of Classification Search
CPC ... H04L 9/0643; H04L 9/0844; H04L 9/3271; H04L 63/30; H04L 9/3236
See application file for complete search history.

(56) References Cited

OTHER PUBLICATIONS

"LI Compliance—Solution Variant on Revealing Long-term Identity to the VPLMN", 3GPP TSG SA WG3 (Security) Meeting #88, S3-171945, Agenda : 8.3.7, Nokia, Aug. 7-11, 2017, 3 pages.

"3rd Generation Partnership Project; Technical Specification Group Services and System Aspects; Study on the security aspects of the next generation system (Release 14)", 3GPP TR 33.899, V1.2.0, Jun. 2017, pp. 1-586.

"3rd Generation Partnership Project; Technical Specification Group Services and System Aspects; Security Architecture and Procedures for 5G System (Release 15)", 3GPP TS 33.501, V0.2.0, May 2017, pp. 1-25.

"3rd Generation Partnership Project; Technical Specification Group Services and System Aspects; System Architecture for the 5G System; Stage 2 (Release 15)", 3GPP TS 23.501, V1.2.0, Jul. 2017, pp. 1-166.

"3rd Generation Partnership Project; Technical Specification Group Services and System Aspects; Procedures for the 5G System; Stage 2 (Release 15)", 3GPP TS 23.502, V0.5.0, Jul. 2017, pp. 1-148.

"SUCI-Null-Scheme Normative Annex", 3GPP TSG SA WG3 (Security) Meeting #88, S3-172105, Agenda: 7.3, Ericsson, Aug. 7-11, 2017, 1 page.

"Subscription Privacy: Proposed Content to Clause 6.8.1 (SUPI)", 3GPP TSG SA WG3 (Security) Meeting #88, S3-172118, Agenda: 7.3, Ericsson, Aug. 7-11, 2017, 1 page.

"Low-Cost IMSI Catcher for 4G/LTE Networks Tracks Phones' Precise Locations", ARS Technica, Retrieved on Feb. 5, 2020, Webpage available at : https://arstechnica.com/information-technology/2015/10/low-cost-imsi-catcher-for-4glte-networks-track-phones-precise-locations/.

Steig et al., "A Network Based IMSI Catcher Detection", 6th International Conference on IT Convergence and Security (ICITCS), Sep. 26, 2016, 6 pages.

DeMarinis, "On LTE Security: Closing the Gap Between Standards and Implementation", Thesis, 2015, 54 pages.

"Long Term Exploitation—Baseband Security", Comsecuris, Retrieved on Feb. 5, 2020, Webpage available at : https://comsecuris.com/slides/lte_4get_about_it.pdf.

International Search Report and Written Opinion received for corresponding Patent Cooperation Treaty Application No. PCT/FI2017/050583, dated Nov. 29, 2017, 15 pages.

"Replay Attack", Wikipedia, Retrieved on Feb. 5, 2020, Webpage available at : https://en.wikipedia.org/w/index.php?title=Replay_attack&oldid=796299926.

"Cryptographic Nonce", Wikipedia, Retrieved on Feb. 5, 2020, Webpage available at : https://en.wikipedia.org/w/index.php?title=Cryptographic_nonce&oldid=796041666.

* cited by examiner

Fig. 1    100
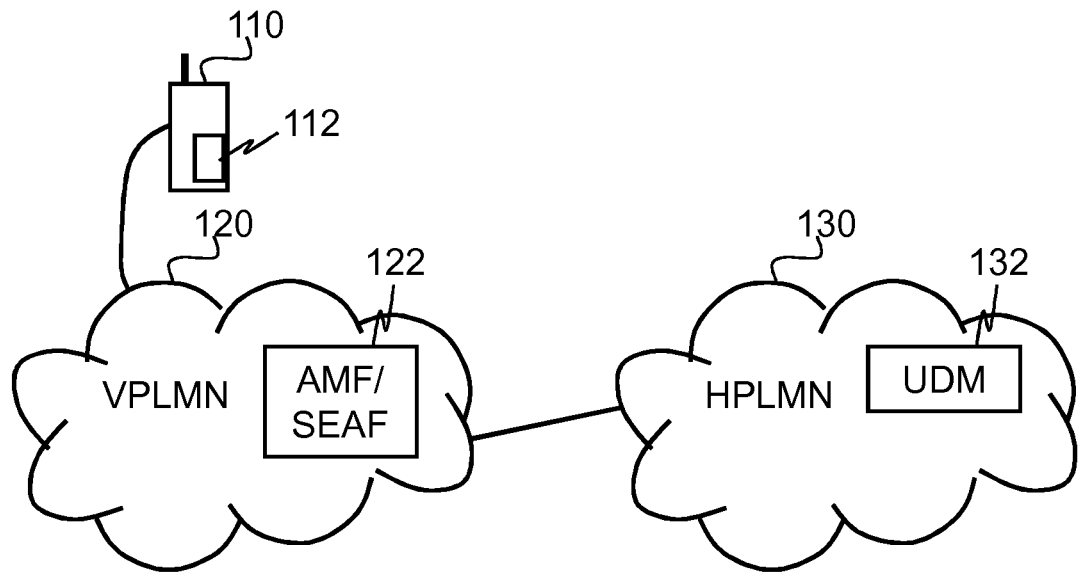
Fig. 3    300
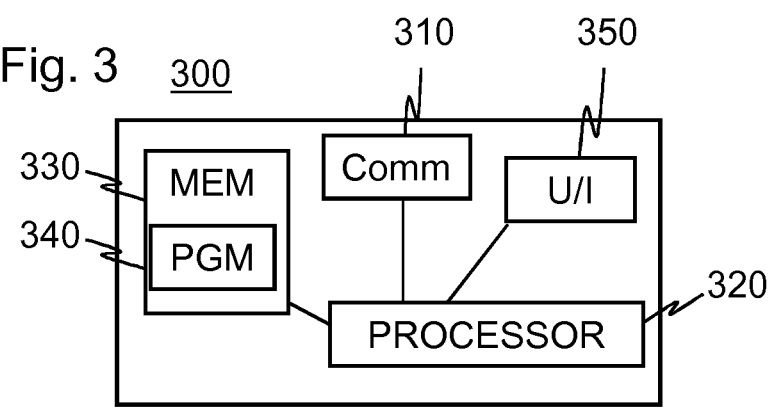
Fig. 4    122
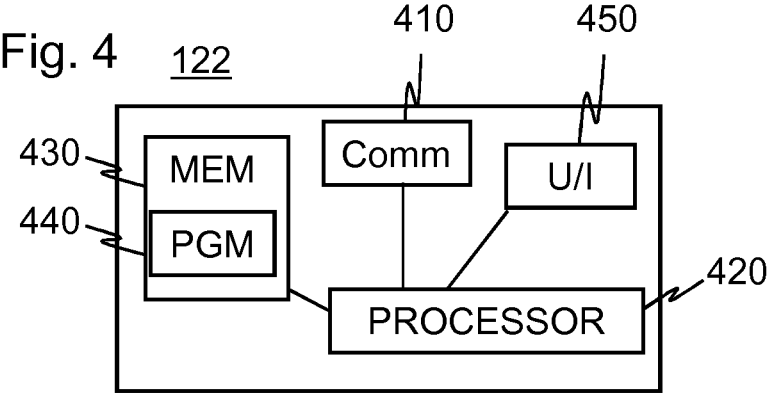

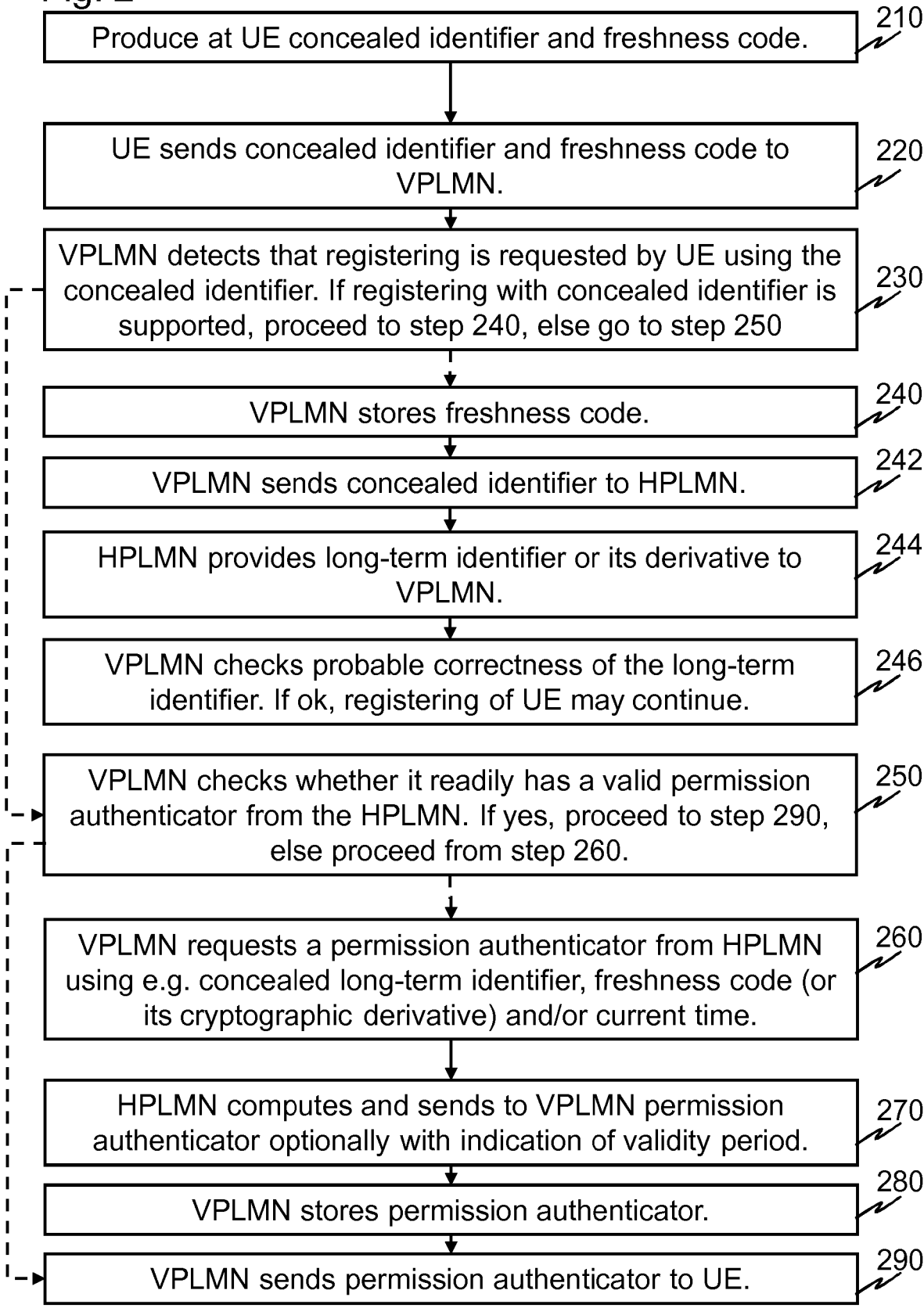

REGISTERING USER EQUIPMENT WITH A VISITED PUBLIC LAND MOBILE NETWORK

RELATED APPLICATION

This application was originally filed as PCT Application No. PCT/FI2017/050583, filed on Aug. 21, 2017.

TECHNICAL FIELD

The present application generally relates to registering user equipment with a visited public land mobile network. In particular, though not exclusively, the present application relates to lawful interception in visited networks.

BACKGROUND

This section illustrates useful background information without admission of any technique described herein representative of the state of the art.

Public Land Mobile Networks (PLMN) have greatly evolved during past decades from rudimentary voice communication enablers to mobile broadband Internet devices. Currently, a fifth generation of mobile networks is being designed e.g. by further developing the Long-Term Evolution (LTE). Voice and data communications are encrypted for maintenance of privacy of the users in all countries save few exceptions. However, there is a need to enable societies to protect themselves or investigate crimes by means of legal interception in which legal authorities are allowed to receive communication of an intercepted subscriber without normal encryption of the PLMN.

In mobile communications, there are typically two independent identities for each subscriber: an identifier of the User Equipment (UE) that identifies e.g. a phone make and model, and a subscription identity that identifies a particular subscription of a PLMN. Typical examples of the UE and subscription identifiers are an International Mobile Equipment Identity (IMEI) and an International Mobile Subscriber Identity (IMSI). Each mobile phone user, or mobile broadband device, needs to pay for the service and the subscription assigns the costs of the use to the respective prepayments or credit contract made by a payee. Moreover, the subscription determines a phone number in use so that the user of the subscription and only that user should be able to place calls and receive calls with that phone number. As of GSM, the subscription and UE identifications have been separate so that different subscriptions can be used in one UE and vice versa. The UE identification helps to recover stolen mobile phones, for example.

Mobile communications impose particular challenges for authenticating the true subscriber, which is important both for authenticating a subscriber to avoid abuse of a subscription of someone else and also for the lawful interception. It is yet desirable to avoid over-the-air exchange of any long-term subscriber identity of the subscription at all by use of a temporary subscriber identity to further improve privacy of the users. The temporary subscriber identity is only known by the home PLMN i.e. HPLMN and the subscriber's subscription module. However, mobile communications is also enabled in visited PLMNs i.e. VPLMNs so as to avoid roaming and the concealing of the subscriber identity prevents lawful interception of that subscriber in particular.

For lawful interception, it suffices if any long-term identifier is known relating to the UE used for communication. The UE identity such as the IMEI and/or the subscriber identity such as the IMSI or MISISDN (Mobile Station International ISDN Number) can be used to target lawful interception as desired. A long-term identifier is used in this document generally for reference to any identifier with which legal interception can be targeted to a desired user equipment or subscription. A concealed identifier is used in this document generally for reference to any identifier that is configured to indicate the long-term identifier in a concealed manner hindering third parties from determining the long-term identifier.

Various solutions have been proposed for indicating the long-term identifier to the VPLMN. These solutions require either or both entrusting the VPLMN to perform the authentication of the UE and sending an additional pair of radio messages in order to verify the long-term identifier of the UE so that availability of lawful interception could be verified at the VPLMN, and all these solutions are inoperable if the VPLMN refuses to register the UE with an encrypted long-term identifier.

SUMMARY

Various aspects of examples of the invention are set out in the claims.

According to a first example aspect of the present invention, there is provided a method for registering user equipment with a visited public land mobile network, VPLMN, comprising:

producing at the user equipment a concealed identifier;
producing at the user equipment a freshness code; and
sending by the user equipment to the VPLMN the concealed identifier and the freshness code;
receiving by the user equipment an identity request from the VPLMN indicating that the long-term identifier must be transmitted to the VPLMN in a non-concealed form;
receiving by the user equipment from the VPLMN a permission authenticator;
verifying at the user equipment if the permission authenticator has been formed with a cryptographic authentication of the home public land mobile network, HPLMN, and the user equipment or a subscription module at the user equipment indicating permission to transmit the long-term identifier to the VPLMN in the non-concealed form and if yes, transmitting the long-term identifier to the VPLMN in the non-concealed form. The transmitting of the long-term identifier to the VPLMN in the non-concealed form in if the permission authenticator has been formed with a cryptographic authentication by the HPLMN may be performed automatically or subjected to approval of the user of the user equipment. The approval may be obtained by prompting the user or by using a previously made user setting. The previously made user setting may be configured to be temporary.

The concealed identifier may be formed based on the long-term identifier. The concealed identifier may be cryptographically formed based on the long-term identifier and a replay attack protector.

The freshness code may comprise at least one of a random number and a time stamp. The time stamp may be generated by the user equipment. The freshness code may comprise or the freshness code may be a cryptographic hash result of identity proof information. The identity proof information may be configured to prove or indicate correctness of a long-term identifier that the VPLMN subsequently receives from the HPLMN. The identity proof information may comprise a replay attack protector. The identity proof information may comprise the concealed identifier and the long-term identifier.

The method may further comprise testing trustworthiness of the obtained long-term identifier using the freshness code; and in case of the testing indicates the trustworthiness of the obtained long-term identifier, registering the user equipment with the VPLMN and not registering the user equipment with the VPLMN if the testing does not indicate the trustworthiness of the obtained long-term identifier.

The method may comprise refusing the identity request by the user equipment if the verifying of the permission authenticator fails to indicate said permission to transmit the long-term identifier to the VPLMN in the non-concealed form. Alternatively, the method may comprise requiring an approval of a user of the user equipment for performing the registering with non-concealed long-term identifier transmission if the verifying of the permission authenticator fails to indicate said permission to transmit the long-term identifier to the VPLMN in the non-concealed form. The approval may be obtained by prompting the user or by using a previously made user setting. The previously made user setting may be configured to be temporary.

The method may comprise performing the sending by the user equipment to the VPLMN the concealed identifier and the freshness code in a registering message. The registering message may be an attach request message. The registering message may be transmitted by the user equipment to the VPLMN before any radio bearer encryption information has been received by the user equipment from the VPLMN, such as a challenge of an authentication vector.

The cryptographic hash function may be a public cryptographic hash function. The cryptographic hash function may be a one-way hash function. The cryptographic hash function may be or employ any one or more of: a universal hash function; a keyed cryptographic hash function; and an unkeyed cryptographic hash function.

The method for registering the user equipment may comprise transfer of the replay attack protector between the VPLMN and the user equipment only with cryptographic protection resulting from encryption or cryptographic hashing.

The replay attack protector may be independently generated at the user equipment. The replay attack protector may be randomized at the user equipment. The replay attack protector may be randomized by the user equipment. The replay attack protector may be randomized by a subscriber identity module accessible by the user equipment. The replay attack protector may be configured to prevent re-use of earlier captured messages by third parties. The replay attack protector may comprise an arbitrary code for using only once. The replay attack protector may be configured to be used more than once by the user equipment by a likelihood less than once per million replay attack protectors. The replay attack protector may comprise a sequential counter maintained by the user equipment. The replay attack protector may comprise a time value expressed as a number of time intervals starting of a given date and time such as seconds elapsed since a given date and time.

According to a second example aspect of the present invention, there is provided a method for registering user equipment with a visited public land mobile network, VPLMN, comprising:
  receiving by the VPLMN from the user equipment a concealed identifier;
  receiving by the VPLMN from the user equipment a freshness code;
  if the VPLMN supports encrypted registering of the user equipment, obtaining a long-term identifier of the user equipment from a home public land mobile network, HPLMN, using the concealed identifier and the freshness code; and
  if the VPLMN does not support encrypted registering of the user equipment, attempting by the VPLMN to register the user equipment with the non-concealed long-term identifier transfer by:
  sending by the VPLMN to the user equipment an identity request for the long-term identifier, the identity request comprising a permission authenticator obtained by the VPLMN from the HPLMN and comprising a cryptographically indicated permission of the HPLMN for the non-concealed long-term identifier transfer from the user equipment to the VPLMN;
  receiving by the VPLMN from the user equipment the long-term identifier in a non-concealed form; and
  signaling by the VPLMN with the HPLMN using the long-term identifier received from the user equipment to register the user equipment with the VPLMN. The identity proof information may consist of the replay attack protector. Alternatively or additionally, the identity proof information may comprise the concealed identifier and the long-term identifier. The identity proof information may consist of the concealed identifier, the long-term identifier and at least a portion of the replay attack protector and of optional padding. Alternatively, the identity proof information may consist of the concealed identifier and the long-term identifier.

The method may comprise using the replay attack protector as the identity proof information for user equipment that use the replay attack protector as their identity proof information and using the concealed identifier and the long-term identifier as parts of the identity proof information for user equipment that use such the concealed identifier and the long-term identifier as parts of the identity proof information. The VPLMN may detect the identity proof information used by the UE and the HPLMN by blind detection. Blind detection refers in this document to that there is no prior knowledge based on which parameter or parameters the cryptographic hashing has been performed and one of possible alternatives is first used to compute a candidate comparison result for testing and if a match is found, the correct parameter or parameters has been used and also the long-term identifier has been verified.

The VPLMN may be aware of the encryption key with which the long-term identifier has been encrypted. The VPLMN may confirm the correctness of the long-term identifier by decrypting the concealed identifier in addition or instead of comparing the hash results on meeting a confirmation condition. The confirmation condition may comprise any one or more of: meeting a random check condition; identifying suspicious traffic from the user equipment or from the HPLMN; and free processing capacity at the VPLMN meeting a given level.

According to a third example aspect of the present invention, there is provided a method for enabling by a home public land mobile network, HPLMN, registering of user equipment with a visited public land mobile network, VPLMN, the method comprising:
  receiving by the HPLMN from the VPLMN a long-term identifier request for a long-term identifier of the user equipment or a permission request for a non-concealed long-term identifier transfer from the user equipment to the VPLMN;

the request for a long-term identifier of the user equipment comprising a concealed identifier and a freshness code that have been received by the VPLMN from the user equipment, wherein the concealed identifier is concealed from others by encryption decryptable by the HPLMN;

if the request received by the HPLMN from the VPLMN is the long-term identifier request, providing the VPLMN with the long-term identifier, optionally with a trustworthiness indicator; and if the request received by the HPLMN from the VPLMN is the permission request, providing the VPLMN with a permission authenticator that cryptographically indicates permission of the HPLMN for the UE to use the VPLMN for non-concealed transmission of the long-term identifier to the VPLMN for enabling the VPLMN to obtain the long-term identifier from the UE in a non-concealed form. The non-concealed form may refer to an unencrypted form. The unencrypted form may comprise added information e.g. by padding. Generally, the non-concealed form may refer to a form in which anyone aware of optionally standardized specification can obtain the content of the long-term identifier without possession of any non-public cryptographic keys.

The trustworthiness indicator may comprise at least some source information of the freshness code.

According to a fourth example aspect of the present invention, there is provided a method for registering user equipment with a visited public land mobile network, VPLMN, comprising:

receiving by the user equipment an identity request from the VPLMN indicating that a long-term identifier of the user equipment must be transmitted to the VPLMN in a non-concealed form;

receiving by the user equipment from the VPLMN a permission authenticator;

verifying at the user equipment if the permission authenticator has been formed with a cryptographic authentication of the home public land mobile network, HPLMN, and the user equipment or a subscription module at the user equipment indicating permission to transmit the long-term identifier to the VPLMN in the non-concealed form and if yes, transmitting the long-term identifier to the VPLMN in the non-concealed form.

According to a fifth example aspect of the present invention, there is provided a method for registering user equipment with a visited public land mobile network, VPLMN, comprising:

receiving by the VPLMN from the user equipment request for registering;

attempting by the VPLMN to register the user equipment with a non-concealed long-term identifier transfer by:

sending by the VPLMN to the user equipment an identity request for the long-term identifier, the identity request comprising a permission authenticator obtained by the VPLMN from the HPLMN and comprising a cryptographically indicated permission of the HPLMN for the non-concealed long-term identifier transfer from the user equipment to the VPLMN;

receiving by the VPLMN from the user equipment the long-term identifier in a non-concealed form; and signaling by the VPLMN with the HPLMN using the long-term identifier received from the user equipment to register the user equipment with the VPLMN. The identity proof information may consist of the replay attack protector. Alternatively or additionally, the identity proof information may comprise the concealed identifier and the long-term identifier.

According to a sixth example aspect of the present invention, there is provided a method for enabling by a home public land mobile network, HPLMN, registering of user equipment with a visited public land mobile network, VPLMN, the method comprising:

receiving by the HPLMN from the VPLMN a permission request for a non-concealed long-term identifier transfer from the user equipment to the VPLMN;

providing the VPLMN with a permission authenticator that cryptographically indicates permission of the HPLMN for the UE to use the VPLMN for non-concealed transmission of the long-term identifier to the VPLMN for enabling the VPLMN to obtain the long-term identifier from the UE in a non-concealed form.

According to a seventh example aspect of the present invention, there is provided a mobile terminal comprising user equipment configured to perform registering with a visited public land mobile network, VPLMN, comprising:

at least one memory;

a communication circuitry; and at least one processor configured to perform the method of the first or fourth example aspect using the at least one memory and the communication circuitry.

According to an eighth example aspect of the present invention, there is provided a network element for a visited public land mobile network, VPLMN, for registering user equipment to the VPLMN and comprising:

a communication interface for communicating with the user equipment and for communicating with a home public land mobile network, HPLMN;

at least one memory for storing information; and at least one processor configured, with the at least one memory and the communication interface, to perform the method of the second or fifth example aspect.

According to a ninth example aspect of the present invention, there is provided a network element for a home public land mobile network, HPLMN, for enabling a user equipment to register with a visited public land mobile network, VPLMN, comprising:

a communication interface for communicating with the VPLMN;

at least one memory for storing information; and at least one processor configured, with the at least one memory and the communication interface, to perform the method of the third or sixth example aspect.

According to a tenth example aspect of the present invention, there is provided a computer program comprising computer executable program code configured cause user equipment to execute the method of the first or fourth example aspect.

According to an eleventh example aspect of the present invention, there is provided a computer program comprising computer executable program code configured to cause a network element for a visited public land mobile network, VPLMN to execute the method of the second or fifth example aspect.

According to a twelfth example aspect of the present invention, there is provided a computer program comprising computer executable program code configured to cause a network element for a home public land mobile network, HPLMN to execute the method of the third or sixth example aspect.

The computer program of any example aspect may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device. The memory medium may be a non-transitory memory medium.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 1 shows an architectural drawing of a system of an example embodiment;

FIG. 2 shows a flow chart of a process of an example embodiment;

FIG. 3 shows a block diagram of an apparatus of an example embodiment; and

FIG. 4 shows a block diagram of another apparatus of an example embodiment.

DETAILED DESCRIPTION OF THE DRAWINGS

An example embodiment of the present invention and its potential advantages are understood by referring to FIGS. 1 through 4 of the drawings. In this document, like reference signs denote like parts or steps.

FIG. 1 shows an architectural drawing of a system 100 of an example embodiment. The system 100 comprises User Equipment (UE) 110 that includes a subscriber module 112 (e.g. a SIM or USIM) either as a hardware or software implemented function. It is irrelevant for many embodiments of the present invention whether particular operation at the UE 110 is performed purely by a User Equipment when understood without the subscriber module 112, by the subscriber module 112, or collectively by the UE 110 and the subscriber module 112. In sake of simplicity, action at the UE 110 may be described with an intent to cover acts taken by either or both the UE 110 and the subscriber module 112.

The system 100 further comprises a Visited Public Land Mobile Network (VPLMN) 120 that includes a network element 122 such as Core Access and Mobility Management Function (AMF) or a security anchor function (SEAF). Notice that the network element 122 need not be solely for performing the functions disclosed herein but the network element 122 may further be configured to perform various other functions. In practice, the network element 122 may be formed of one or more parts of the VPLMN 120 and/or software run by the VPLMN. Hence, the network element 122 should be understood broadly.

The system 100 further comprises a Home Land Mobile Network (HPLMN) 130. The HPLMN comprises in an example embodiment a Unified Data Management (UDM) function 132.

The terms visited and home Land Mobile Network refer to the role of the network in question with regard to the UE 110 or more particularly with regard to the subscription of the UE 112. The Land Mobile Network whose subscriber the UE 110 is (e.g. based on its current subscriber module 112) is denoted as the HPLMN and a Land Mobile Network to which the UE 110 has roamed is denoted as the VPLMN. At any one time, typical Land Mobile Networks act for some subscribers as the HPLMN and for some other subscribers as the VPLMN. FIG. 2 shows a flow chart of a process of an example embodiment.

In step 210, a concealed identifier SUPI* is produced at the User Equipment 110, optionally within a subscriber module using a long-term identifier SUPI e.g. as SUPI*=$PK_{HPLMN}$(SUPI,R) and possibly including additional parameters as further input for the encryption. The denotation $PK_{HPLMN}$( ) indicates encryption of the parameters indicated within parenthesis using an encryption key $PK_{HPLMN}$ of the HPLMN. R designates a replay attack protector such as a cryptographic nonce, e.g. an arbitrary or random number or code.

Further, in step 210, either simultaneously or before or after the computing of the long-term identifier, a freshness code is produced by the UE 110. The freshness code is in an example embodiment a cryptographic hash of identity proof information that comprises the replay attack protector or both the concealed and long-term identifiers, e.g. as hxres=H (R) or as hxres=H(SUPI*,SUPI) (optionally also using R for computing the hxres in addition to SUPI*,SUPI). The Expected hash response hxres is included in an in initial registration message of the UE 110 in an example embodiment. H denotes a cryptographic hash function configured to hinder determination of source information from the result of the hash code. In another example embodiment, the freshness code may be an arbitrary code such as a random code or other changing code such as a time stamp or sequence number or a cryptographic derivative thereof. The freshness code is in an embodiment different than the replay attack protector. In another embodiment, the freshness code is the replay attack protector.

Notice that in the encryption and hashing examples of preceding paragraphs, two parameters were jointly used as a source of a cryptographic function (encryption or hashing). Comma as a delimiter is only intended to distinguish the different parameters, but these parameters can be combined in any manner and order as per implementation. For example, the parameters can be concatenated, each character can be summed up and optionally a modulo of e.g. 255 can be taken, the parameters can be combined with XOR etc. Further, truncation can be freely applied to reduce length or computational burden in any of the input parameters or results of functions.

In step 220, the UE 110 sends the concealed identifier and the freshness code to the VPLMN 120, for example to the network element 122.

In step 230, the VPLMN 120 detects that registering is requested by the UE 110 using the concealed identifier. Depending on the implementation of the VPLMN, based on national security requirements, for example, the process next branches to perform registering of the UE 110 with the VPLMN 120 in a first branch as of step 240 with the concealed identifier or in a second branch as of step 250 with a non-concealed long-term identifier. The non-concealed identifier is produced in an example embodiment by simply padding a data field with given bits. In some embodiments, a null-encryption scheme is used wherein encryption is applied to the long-term identifier with an algorithm that maintains one-to-one relationship between input and output.

In step 240, the VPLMN 120 stores (e.g. by the network element 122) the freshness code and the concealed identifier.

In step 242, the VPLMN 120 sends the concealed identifier to the HPLMN 130. In an example embodiment, the following steps that are performed in the HPLMN are performed by a Unified Data Management (UDM) function of the HPLMN.

Depending on implementation, the HPLMN 130 performs itself authentication of the UE 110 (or with the UE) or issues an authentication vector AV to the VPLMN 120 to delegate this task to the VPLMN 120. The authentication may involve e.g. an Authentication and Key Agreement, AKA, process.

In step 244, during or after authentication, the HPLMN 130 provides the long-term identifier SUPI and a trustworthiness indication such as at least some of the source information of the freshness code, e.g. the replay attack protector R (at least if the hxres was formed by hashing R) to the VPLMN 120, e.g. to the network element 122. The trustworthiness indication is configured to indicate that the VPLMN 120 has a reason to trust that the HPLMN 130 has truthfully issued the long-term identifier SUPI for lawful interception (LI) use, for example.

In step 246, the VPLMN 120 or therein the network element 122 checks probable correctness of the long-term identifier SUPI. If the HPLMN is truthful, calculation of local version of freshness code hxres matches that stored in step 240 and the VPLMN 120 may continue registering of the UE 110, otherwise the VPLMN 120 may reject the registering request of the UE 110.

In an example embodiment, the VPLMN 120 has been informed by the UE 110 or the HPLMN 120 of the source of the identity proof information used by the UE 110 in question. In that case, the VPLMN 120 computes its local version of hxres readily with the correct parameters. The informing of the source of the identity proof information may be indirectly performed by omitting the replay attack protector by the HPLMN in case the long-term identifier and the conceal identifier have been used in the identity proof information and the replay attack protector is not needed for computing the hxres. Alternatively, if the VPLMN 120 is not aware of the implementation used by the UE 110, the VPLMN may perform blind detection by first testing whether hxres(R) matches the hxres received from the UE 110 and stored in step 240. If there are more than two different alternatives for the source of the hash result, then the blind detection comprises attempting another alternative source and if that matches, deducing that was the correct source and also the identity proof information hashing has proven the correctness of the long-term identifier.

In the second branch, the VPLMN 120 does not allow the UE 110 to register therewith using the concealed long-term identifier. The VPLMN 120 now has an encrypted long-term identifier that it cannot use for the registering of the UE 110. Depending on implementation, the VPLMN 120 uses at least one of the concealed long-term identifier (e.g. SUPI*), the freshness code (e.g. hxres) or current time to request 260 a permission authenticator from the HPLMN 130. In an example embodiment, the VPLMN 120 modifies the freshness code e.g. by hashing with a function unknown to the HPLMN 130. The HPLMN 130 computes and sends 270 to the VPLMN 120 the permission authenticator based on some changing information such as any information used by the UE 110 in step 220 to send request registering (e.g. SUPI* or any source information thereof or the freshness code or any source information thereof) or current time and a cryptographic authentication measure. In an example embodiment, the permission authenticator is a cryptographic signature. In another example embodiment, the permission authenticator is information encrypted by the HPLMN 130 with its secret. For example, the permission authenticator may be encrypted using shared secret or public/private key encryption. The permission authenticator is configured in an example embodiment to enable the UE 110 to verify that the HPLMN 130 has authorized the UE 110 to send the long-term identifier non-concealed to the VPLMN 120. That the authorization concerns the VPLMN 120 and not some other PLMN can be shown in using an identifier of the VPLMN 120 or e.g. by binding the permission authenticator to some information used or produced by the UE 110 in its registering request. If current time is used to temporally limit validity of the permission authenticator, the permission authenticator may comprise also the identifier of the VPLMN 120 so as to limit the applicability of the permission authenticator to the VPLMN 120 only. It should be appreciated that instead of using an identifier of the entire PLMN such as the VPLMN 120, an identifier of a sub-part of the network such as a base station identifier can be used correspondingly. Furthermore, in an example embodiment, the VPLMN 120 need not send a new request to the HPLMN 130 for the permission authenticator if the VPLMN 120 readily possesses a valid permission authenticator from the HPLMN 130 formed such that the permission authenticator is good for any UE 110 with a subscription of the HPLMN 130. In this case, the process advances from step 230 instead of step 240 to step 250 wherein the VPLMN 120 checks whether it readily has a valid permission authenticator from the HPLMN 130. If not, the VPLMN sends 260 to the HPLMN 130 a request for the permission authenticator, optionally with either or both of the concealed long term identifier SUPI* of the UE 110 and the freshness code. In response, the HPLMN 130 computes and sends 270 to the VPLMN 120 the permission authenticator and optionally an indication of a validity period of the permission authenticator if validity of the permission authenticator is temporally restricted to expire after a given period or at a given time. The VPLMN then stores 280 the permission authenticator for subsequent use with any UE 110 that has a subscription from the HPLMN 130. In step 290, the VPLMN sends the permission authenticator to the UE 110 to indicate permission of the HPLMN 130 for registering to the VPLMN with the non-concealed long-term identifier.

FIG. 3 shows a block diagram of an apparatus 300 such as a public land mobile network terminal according to an embodiment of the invention.

The apparatus 300 comprises a memory 330 including a persistent computer program code 340. The apparatus 300 further comprises a processor 320 for controlling the operation of the apparatus 300 using the computer program code 340, a communication unit 310 for communicating with various local devices and with the public land mobile networks. The communication unit 310 comprises, for example, a local area network (LAN) port; a wireless local area network (WLAN) unit; Bluetooth unit; cellular communication unit; or satellite communication unit. The processor 320 comprises, for example, any one or more of: a master control unit (MCU); a microprocessor; a digital signal processor (DSP); an application specific integrated circuit (ASIC); a field programmable gate array; and a microcontroller. The apparatus 300 optionally comprises a user interface 350.

FIG. 4 shows a block diagram of the network element 122 according to an embodiment of the invention for use in the VPLMN 120 or in the HPLMN 130. The network element may be formed of a server computer and suitable software. The network element 122 may comprise parallel components for improving resilience and/or speed of the network element 122.

The network element 122 comprises a memory 430 including a persistent computer program code 440. The network element 122 further comprises a processor 420 for controlling the operation of the network element 122 using the computer program code 440, a communication unit 410 for communicating with other networks and user equipment. The network element 122 optionally comprises a user interface 450. The communication unit 410 comprises, for example, one or more local area network (LAN) ports. The processor 420 comprises, for example, any one or more of: a master control unit (MCU); a microprocessor; a digital signal processor (DSP); an application specific integrated circuit (ASIC); a field programmable gate array; and a microcontroller.

Without in any way limiting the scope, interpretation, or application of the claims appearing below, a technical effect of one or more of the example embodiments disclosed herein is that possibility for lawful interception in a visited public land mobile network can be verified with fair degree of reliability with little computational cost and without need for new radio message signals over downlink. Another technical effect of one or more of the example embodiments disclosed herein is that the long-term identifier of user equipment can be verified by the visited public land mobile network with fair degree of reliability with the same process regardless which network actually performs an authentication process of the user equipment on registering the user equipment. Yet another technical effect is that the possibility of lawful interception may be tested so that the association of the long-term identifier and the concealed identifier is verifiable without need to transfer the long-term identifier over air interface without encryption even before any encrypted radio bearer is formed for the UE by the VPLMN. Yet further technical effect is that the possibility of lawful interception may be tested so that the association of the long-term identifier and the concealed identifier is verifiable without need to transfer the long-term identifier over air interface without encryption even before any encrypted radio bearer is formed for the UE by the VPLMN and without exposing the long-term identifier to brute force attacks. Yet further technical effect is that the registering may be enabled with VPLMNs that do not support concealing the long-term identifier with a cryptographic vouching by the HPLMN for reasonable reliability of the VPLMN and/or for preventing cheating the UE to reveal its long-term identifier to fake VPLMNs. Yet further technical effect is that the UE need not rely on predefined lists of trusted VPLMNs and the HPLMN can react fast if some VPLMN loses trust of the HPLMN by no longer granting authorization for non-concealed long-term identifier transfer to the VPLMN in question.

Embodiments of the present invention may be implemented in software, hardware, application logic or a combination of software, hardware and application logic. The software, application logic and/or hardware may reside entirely or in part on a memory of the apparatus 300 or the network element 122. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A mobile terminal comprising user equipment comprising:
   at least one processor; and
   at least one memory including computer program code;
      the at least one memory and the computer program configured to, with the at least one processor, cause the mobile terminal at least to:
   register the user equipment with a visited public land mobile network comprising:
   producing at the user equipment a concealed identifier;
   producing at the user equipment a freshness code comprising a cryptographic hash result of identity proof information; and
   sending by the user equipment to the visited public land mobile network the concealed identifier and the freshness code;
   receiving by the user equipment an identity request from the visited public land mobile network indicating that a long-term identifier of the user equipment must be transmitted to the visited public land mobile network in a non-concealed form, if the visited public land mobile network does not support use of the concealed identifier for registering the user equipment with the visited public land mobile network;
   receiving by the user equipment from the visited public land mobile network a permission authenticator; and
   verifying at the user equipment the permission authenticator has been formed with a cryptographic authentication of the home public land mobile network, and the user equipment or a subscription module at the user equipment indicating permission to transmit the long-term identifier to the visited public land mobile network in the non-concealed form and based on the verifying transmitting the long-term identifier to the visited public land mobile network in the non-concealed form.

2. The mobile terminal of claim 1,
wherein the identity proof information comprises the concealed identifier and the long-term identifier.

3. The mobile terminal of claim 1, wherein the at least one memory, the computer program and the at least one processor is further configured to cause the mobile terminal to:
refuse the identity request by the user equipment based on the verifying of the permission authenticator failing to indicate said permission to transmit the long-term identifier to the visited public land mobile network in the non-concealed form.

4. The mobile terminal of claim 1, wherein the at least one memory, the computer program and the at least one processor is further configured to cause the mobile terminal to:
perform the registering with non-concealed long-term identifier transmission based on the verifying of the permission authenticator failing to indicate said permission to transmit the long-term identifier to the visited public land mobile network in the non-concealed form when an approval is received from the user of the user equipment.

5. The mobile terminal of claim 1, wherein the concealed identifier and the freshness code are provided to the visited public land mobile network from the user equipment in an attach request message before any radio bearer encryption information has been received by the user equipment from the visited public land mobile network.

6. The mobile terminal of claim 1, wherein the identity proof information comprises a replay attack protector.

7. An apparatus, comprising:
at least one processor; and
at least one memory comprising computer program code; the at least one memory and the computer program code configured to, with the at least one processor, cause the apparatus at least to perform:
registering user equipment with a visited public land mobile network, comprising:
receiving from the user equipment a concealed identifier;
receive from the user equipment a freshness code comprising a cryptographic hash result of identity proof information;
if the visited public land mobile network supports encrypted registering of the user equipment, obtaining a long-term identifier of the user equipment from a home public land mobile network, by using the concealed identifier and the freshness code; and
if the visited public land mobile network does not support encrypted registering of the user equipment, attempting to register the user equipment with the non-concealed long-term identifier by:
sending to the user equipment an identity request for the long-term identifier, the identity request comprising a permission authenticator obtained by the visited public land mobile network from the HPLMN and comprising a cryptographically indicated permission of the home public land mobile network for the non-concealed long-term identifier transfer from the user equipment to the visited public land mobile network; and
receiving from the user equipment the long-term identifier in a non-concealed form; and signal with the home public land mobile network using the long-term identifier received from the user equipment to register the user equipment with the visited public land mobile network.

8. The apparatus of claim 7, wherein the at least one memory, the computer program and the at least one processor is further configured to cause to the apparatus to:
perform, when executing the computer program code:
sending a permission request to the home public land mobile network for the non-concealed long-term identifier transfer from the user equipment to the visited public land mobile network, the permission request comprising the freshness code; and
receiving from the home public land mobile network the permission authenticator for the non-concealed long-term identifier transfer for the user equipment, the permission authenticator comprising a cryptographic derivative of data comprising the freshness code based on the home public land mobile network permitting transmission of the non-concealed long-term identifier from the user equipment to the visited public land mobile network.

9. The apparatus of claim 7, wherein the at least one memory, the computer program and the at least one processor is further configured to cause to the apparatus to perform:
when executing the computer program code: test trustworthiness of the obtained long-term identifier; and
based on the testing indicating the trustworthiness of the obtained long-term identifier, register the user equipment with the visited public land mobile network and not register the user equipment with the visited public land mobile network if the testing does not indicate the trustworthiness of the obtained long-term identifier.

10. The apparatus of claim 7, wherein the at least one memory, the computer program and the at least one processor is further configured to cause to the apparatus to:
when executing the computer program code: obtain from the home public land mobile network the permission authenticator before the receiving by the visited public land mobile network of the concealed identifier from the user equipment; the cryptographically indicated permission of the home public land mobile network for the non-concealed long-term identifier transfer from the user equipment to the visited public land mobile network being a general permission independent of the concealed identifier and of the freshness code.

11. An apparatus comprising:
at least one processor; and
at least one memory comprising computer program code; the at least one memory and the computer program code configured to, with the at least one processor, cause the apparatus at least to perform:
enabling a home public land mobile network to register of user equipment with a visited public land mobile network, comprising:
receiving from the visited public land mobile network a long-term identifier request for a long-term identifier of the user equipment or a permission request for a non-concealed long-term identifier transfer from the user equipment to the visited public land mobile network;
the long term-identifier request of the user equipment comprising a concealed identifier and a freshness code comprising a cryptographic hash result of identity proof information that have been received by the visited public land mobile network from the user equipment, wherein the concealed identifier is concealed from others by encryption decryptable by the home public land mobile network; if the request received by the home public land mobile network from the visited public land mobile network is the long-term identifier request, provide the visited public land mobile network with the long-term identifier; and if the request received by the home public land mobile network from the visited public land mobile network is the permission request, providing the visited public land mobile network with a permission authenticator that cryptographically indicates permission of the home public land mobile network for the user equipment to use the visited public land mobile network for non-concealed transmission of the long-term identifier to the visited public land mobile network for enabling the visited public land mobile network to obtain the long-term identifier from the user equipment in a non-concealed form.

12. The apparatus of claim 11, wherein the concealed identifier and the freshness code are provided to the visited public land mobile network from the user equipment in an attach request message before any radio bearer encryption information has been received by the user equipment from the visited public land mobile network.

13. The apparatus of claim 11, wherein the freshness code comprises a cryptographic hash result of identity proof information.

14. The apparatus of claim 13, wherein the identity proof information comprises the replay attack protector.

15. The apparatus of claim 13, wherein the identity proof information comprises the concealed identifier and the long-term identifier.

\* \* \* \* \*